(12) United States Patent
Yokoyama et al.

(10) Patent No.: US 7,766,072 B2
(45) Date of Patent: Aug. 3, 2010

(54) MOLDING MACHINE, CLAMPING SYSTEM, BURR DETECTION METHOD, AND ABNORMALITY DETECTION METHOD

(75) Inventors: Hiroshi Yokoyama, Ebina (JP); Saburo Noda, Atsugi (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 817 days.

(21) Appl. No.: 11/560,097

(22) Filed: Nov. 15, 2006

(65) Prior Publication Data
US 2008/0206382 A1 Aug. 28, 2008

(30) Foreign Application Priority Data
Nov. 17, 2005 (JP) ............................. 2005-332720
Nov. 17, 2005 (JP) ............................. 2005-332721

(51) Int. Cl.
B22D 33/04 (2006.01)
B22D 17/26 (2006.01)
B22D 46/00 (2006.01)
B29C 45/64 (2006.01)
B29C 45/80 (2006.01)

(52) U.S. Cl. .................... 164/137; 164/457; 164/154.2; 164/343; 264/40.5; 425/150; 425/595

(58) Field of Classification Search ............. 164/154.2, 164/154.8, 343, 457, 137; 425/149, 150, 425/451.9, 595; 264/40.5
See application file for complete search history.

(56) References Cited

U.S. PATENT DOCUMENTS

| 5,338,171 A * | 8/1994 | Hayakawa et al. .......... 425/138 |
| 6,595,766 B2 * | 7/2003 | Nakamoto ................... 425/149 |
| 6,821,104 B2 * | 11/2004 | Kubota et al. ............... 425/150 |
| 7,114,949 B2 * | 10/2006 | Nishizawa et al. .......... 425/590 |
| 7,217,115 B2 * | 5/2007 | Shin et al. ................... 425/171 |
| 7,287,972 B2 | 10/2007 | Tsuji et al. |
| 7,288,221 B2 * | 10/2007 | Tsuji et al. ................. 264/40.5 |

FOREIGN PATENT DOCUMENTS

| CN | 1683143 A | 10/2005 |
| JP | H01-055069 B2 | 11/1989 |
| JP | P3245311 B2 | 10/2001 |

OTHER PUBLICATIONS

Chinese Office Action issued in Application No. 200610063905.9 mailed Jun. 6, 2008.
Translation of Chinese Office Action issued in Application No. 200610063905.9 mailed Jun. 6, 2008.

* cited by examiner

Primary Examiner—Kevin P Kerns
(74) Attorney, Agent, or Firm—DLA Piper LLP (US)

(57) ABSTRACT

A molding machine able to detect a burr or other abnormality by detecting the position of tie bars. A control device detects an occurrence of burrs according to whether or not displacement amounts of pistons associated with the tie bars, using position sensors which detect the position of the pistons. The position sensors detect position from the start of injection to the completion of the injection to determine whether detected values are within a permissible range.

9 Claims, 7 Drawing Sheets

MOLDING MACHINE, CLAMPING SYSTEM, BURR DETECTION METHOD, AND ABNORMALITY DETECTION METHOD

BACKGROUND OF THE INVENTION

1. Field of the Invention

The present invention relates to a molding machine, a clamping system, a burr detection method, and an abnormality detection method.

2. Description of the Related Art

In a molding machine for example a die cast machine, sometimes the melt sprays out from the mating surfaces of the mold resulting in burrs. Various techniques for detecting such burrs have been proposed. Burrs occur due to for example the presence of foreign matter at the mating surfaces of the mold or due to a mold opening force due to the pressure of the melt injected and filled into the cavity of the mold locally exceeding the clamping force.

Japanese Patent Publication (B2) No. 1-55069 discloses technology for detecting occurrence of a burr by comparing an amount of extension of a tie bar at the time of a completion of the clamping and the amount of extension of the tie bar at the time of the completion of the injection.

Further, in a clamping system used in a molding machine for example a die cast machine, any foreign matter existing between the mold parts induces damage to the mold and the formation of burrs. Therefore, various art for detecting the foreign matter have been proposed.

Japanese Patent No. 3245311 judges existence of any foreign matter based on position detection of a moving mold plate. Namely, when there is no foreign matter between a fixed mold plate and the moving mold plate, the moving mold plate can move up to a previously determined mold contact position with a predetermined drive force, but when there is foreign matter, the moving mold plate cannot contact the fixed mold plate and accordingly the moving mold plate cannot move up to the mold contact position. Therefore, existence of any foreign matter is judged according to whether or not the position of the moving mold plate detected by a detector reaches the mold contact position.

In Japanese Patent Publication (B2) No. 1-55069, the tie bars are completely fixed to the fixed mold plate. The amount of extension of a tie bar is detected at the end of the tie bar fixed to the fixed mold plate. Namely, a strain gauge etc. is used to detect the amount of extension at a portion of the tie bar. On the other hand, a tie bar changes in amount of extension corresponding to the thickness of the burr over the entire length between the moving mold plate and the fixed mold plate. Accordingly, Japanese Patent Publication (B2) No. 1-55069 detects only the part corresponding to the thickness of the burr. The detector of the amount of extension must consequently be configured by high precision components. Note that in the clamping system of Japanese Patent Publication (B2) No. 1-55069, the tie bars are completely fixed to the fixed mold plate, therefore the system is considered to be a toggle type clamping system.

Japanese Patent No. 3245311 measures the position of the moving mold plate at one location. On the other hand, the moving mold plate and the fixed mold plate sometimes are not kept parallel due to mechanical error etc. In this case, one edge side of the mating surface of the moving mold plate contacts the mating surface of the fixed mold plate earlier than the other edge side. Further, even after the mold parts contact, sometimes only one edge side contacts the mating surface and the other edge side does not contact it. Accordingly, when detecting the position of the moving mold plate at the contacting edge side, irrespective of the presence of foreign matter in a clearance between the mold parts at the edge side where the mold parts do not contact, it ends up being judged that the detected position has reached the contact position and there is no foreign matter. In other words, in the art of Japanese Patent No. 3245311, sometimes foreign matter cannot be detected over a wide range of the mold mating surfaces.

As described above, conventionally, the positions of a plurality of tie bars have not been detected and the detection results effectively utilized.

SUMMARY OF THE INVENTION

An object of the present invention is to provide a molding machine, a clamping system, a burr detection method, and an abnormality detection method able to detect the occurrence of a burr and foreign matter with a high precision by detecting positions of a plurality of tie bars.

According to a first aspect of the present invention, there is provided a molding machine injecting a melt into a cavity defined by clamped fixed mold and moving mold, comprising a fixed mold plate holding the fixed mold, a moving mold plate holding the moving mold and moveable in a mold open and close direction with respect to the fixed mold plate, a plurality of tie bars each having a coupled part coupling with one of the fixed mold plate and the moving mold plate and a tie bar drive piston accommodated at the other of the fixed mold plate and the moving mold plate and generating clamping force, a plurality of coupling parts provided at the one of the fixed mold plate and the moving mold plate and able to be coupled with or released from the coupled parts of the plurality of tie bars, a plurality of clamping cylinders provided at the other of the fixed mold plate and the moving mold plate and having cylinder chambers accommodating the plurality of tie bar drive pistons and at least two working fluid feed ports feeding working fluid generating the clamping force into the cylinder chambers, an injection system injecting the melt into the cavity after the completion of clamping by the clamping cylinders, position sensors detecting positions of the plurality of tie bar drive pistons, and a burr detector detecting the occurrence of a burr according to whether or not displacement amounts of the plurality of tie bar drive pistons detected by the position sensors for a period from the start of the injection by the injection system to the completion of the injection are within predetermined permissible ranges.

Preferably, the machine is further having a foreign matter detector detecting foreign matter between the fixed mold and the moving mold before the completion of the clamping and a control device controlling the injection system so that melt is not injected into the cavity when the foreign matter detector detects foreign matter.

Preferably, the machine is further having pressure sensors detecting the pressures of the cylinder chambers and a control device controlling the operation of valves so that the pressures detected by the pressure sensors reach predetermined clamping completion pressures, and the foreign matter detector detects foreign matter between mold parts according to judgment of whether or not differences between positions of the plurality of tie bar drive pistons detected by the position sensors when the pressures detected by the pressure sensors reach the predetermined clamping completion pressures and predetermined reference positions are within predetermined permissible ranges.

According to a second aspect of the present invention, there is provided a clamping system clamping a fixed mold and a moving mold, the clamping system comprising a fixed mold plate holding the fixed mold, a moving mold plate holding the moving mold and moveable in a mold open and close direction with respect to the fixed mold plate, a plurality of tie bars each having a coupled part coupling with one of the fixed mold plate and the moving mold plate and a tie bar drive piston accommodated at the other of the fixed mold plate and the moving mold plate and generating clamping force, a plurality of coupling parts provided at the one of the fixed mold plate and the moving mold plate and able to be coupled with or released from the coupled parts of the plurality of tie bars, a plurality of clamping cylinders provided at the other of the fixed mold plate and the moving mold plate and having cylinder chambers accommodating the plurality of tie bar drive pistons and at least two working fluid feed ports feeding working fluid generating the clamping force into the cylinder chambers, a plurality of valves connected to the working fluid feed ports controlling the feed of the working fluid into first cylinder chambers and second cylinder chambers partitioned by the tie bar drive pistons in the plurality of clamping cylinders, pressure sensors detecting the pressures of at least one of the first cylinder chambers and the second cylinder chambers, a control device controlling operations of the valves so that the pressures detected by the pressure sensors reach the predetermined clamping completion pressures, position sensors detecting positions of the plurality of tie bar drive pistons, and a clamping abnormality detector detecting an abnormality between mold parts by judgment of whether or not the differences between positions of the plurality of tie bar drive pistons detected by the position sensors when the pressures detected by the pressure sensors reach the predetermined clamping completion pressures and the predetermined reference positions are within predetermined permissible ranges.

Preferably, the clamping abnormality detector updates the reference positions by using positions of the tie bar drive pistons detected by the position sensors when an abnormality is not detected.

Preferably, the clamping system is further having a drive portion imparting a drive force in a mold open and close direction to the moving mold plate and a mold closing abnormality detector detecting an abnormality between mold parts from the start of the mold closing to the mold contact, and the control device controls the drive portion so as to stop the drive force to the moving mold plate when the mold closing abnormality detector detects an abnormality.

Preferably, the mold closing abnormality detector monitors a movement speed of the moving mold plate or a load of the drive portion and detects an abnormality between molds according to whether or not a fluctuation of the movement speed or the load is within a predetermined permissible range.

According to a third aspect of the present invention, there is provided a burr detection method of a molding machine injecting a melt into a cavity defined by a clamped fixed mold and moving mold, the molding machine having a fixed mold plate holding the fixed mold, a moving mold plate holding the moving mold and moveable in a mold open and close direction with respect to the fixed mold plate, a plurality of tie bars each having a coupled part coupling with one of the fixed mold plate and the moving mold plate and a tie bar drive piston accommodated at the other of the fixed mold plate and the moving mold plate and generating clamping force, a plurality of coupling parts provided at the one of the fixed mold plate and the moving mold plate and able to be coupled with or released from the coupled parts of the plurality of tie bars, and a plurality of clamping cylinders provided at the other of the fixed mold plate and the moving mold plate and having cylinder chambers accommodating the plurality of tie bar drive pistons and at least two working fluid feed ports feeding working fluid generating the clamping force into the cylinder chambers, comprising detecting positions of the plurality of tie bar drive pistons and detecting the occurrence of the burrs according to whether or not displacement amounts of the plurality of tie bar drive pistons detected from the start of the injection to the completion of the injection are within predetermined permissible ranges.

According to a fourth aspect of the present invention, there is provided an abnormality detection method detecting an abnormality between mold parts in a clamping system clamping a fixed mold and a moving mold, the clamping system having a fixed mold plate holding the fixed mold, a moving mold plate holding the moving mold and moveable in a mold open and close direction with respect to the fixed mold plate, a plurality of tie bars each having a coupled part coupling with one of the fixed mold plate and the moving mold plate and a tie bar drive piston accommodated at the other of the fixed mold plate and the moving mold plate and generating clamping force, a plurality of coupling parts provided at the one of the fixed mold plate and the moving mold plate and able to be coupled with or released from the coupled parts of the plurality of tie bars, and a plurality of clamping cylinders provided at the other of the fixed mold plate and the moving mold plate and having cylinder chambers accommodating the plurality of tie bar drive pistons and at least two working fluid feed ports feeding working fluid generating the clamping force into the cylinder chambers, comprising detecting pressures of the cylinder chambers, controlling the feeding of the working fluid into the cylinder chambers so that the detected pressures reach the predetermined clamping completion pressures, detecting positions of the plurality of tie bar drive pistons when the pressures detected reach the predetermined clamping completion pressures, and detecting an abnormality between mold parts by judgment of whether or not the differences between detected positions and the predetermined reference positions are within predetermined permissible ranges.

According to the present invention, by detecting positions of the plurality of tie bars, the occurrence of burrs and foreign matter can be detected with a high precision.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
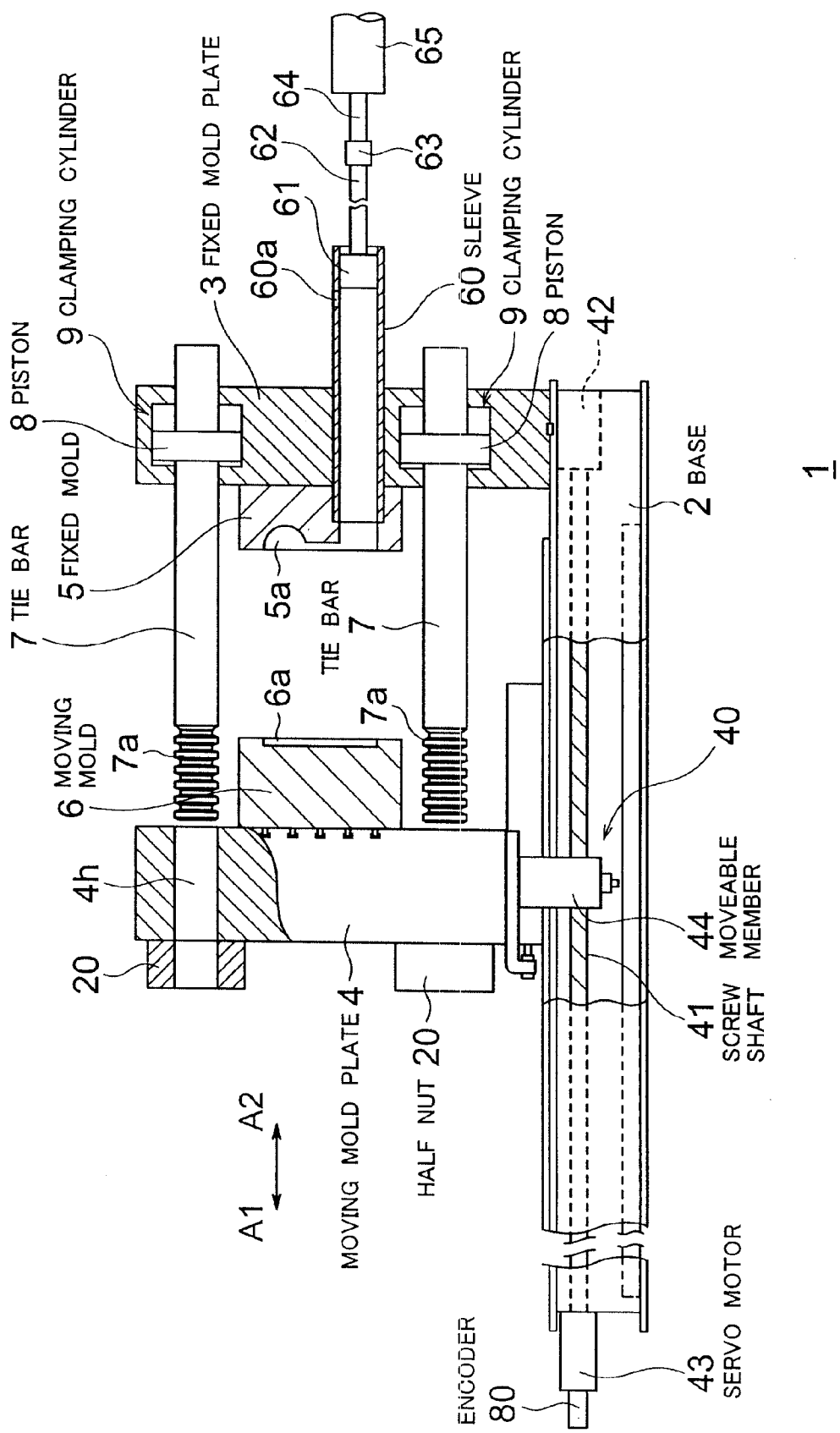
FIG. 1 is a front view including a partial sectional view showing the configuration of mechanical parts of a die cast machine according to an embodiment of the present invention.
Figure 2:
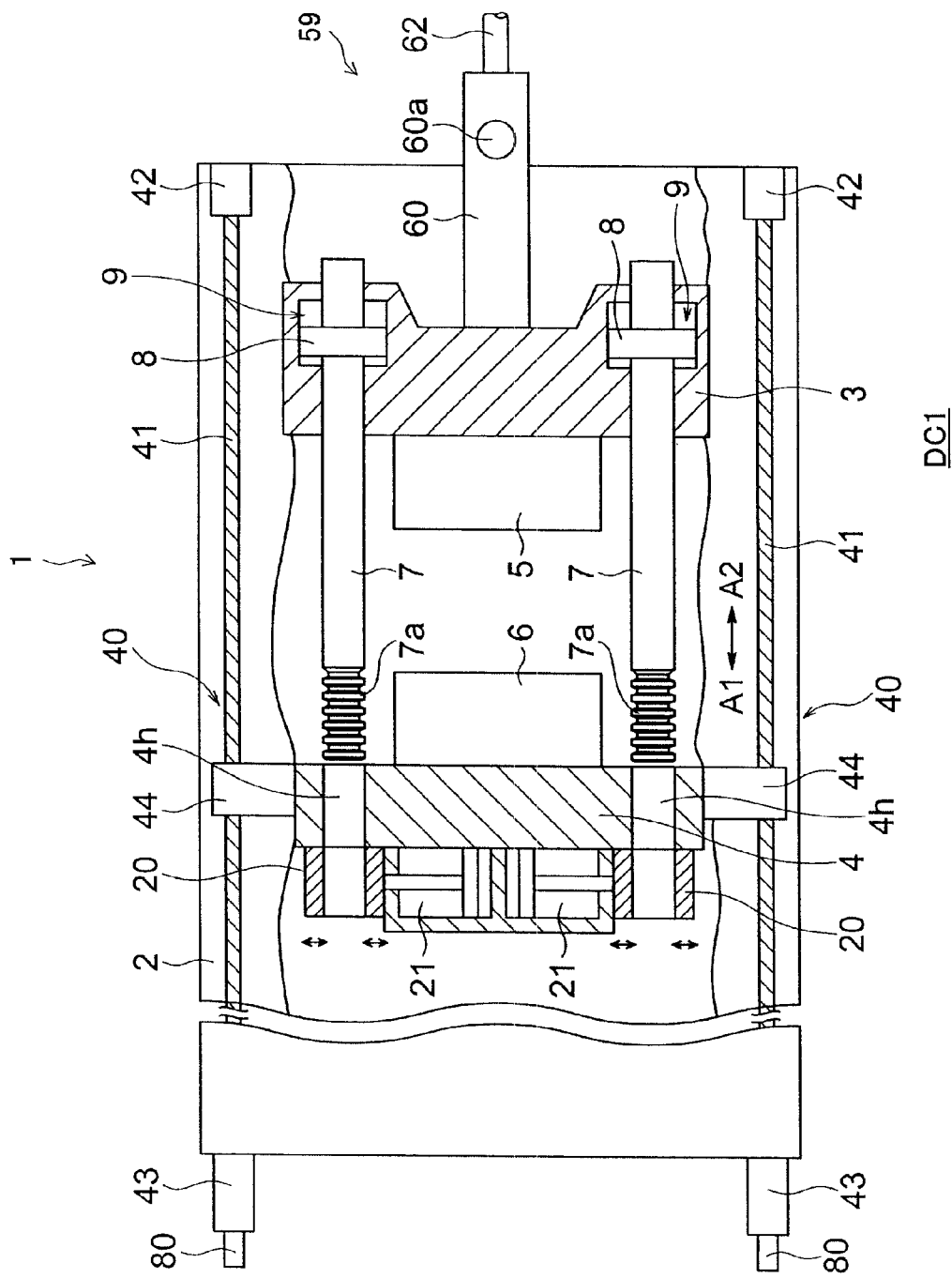
FIG. 2 is a view of the die cast machine of FIG. 1 as seen from above.
Figure 3:
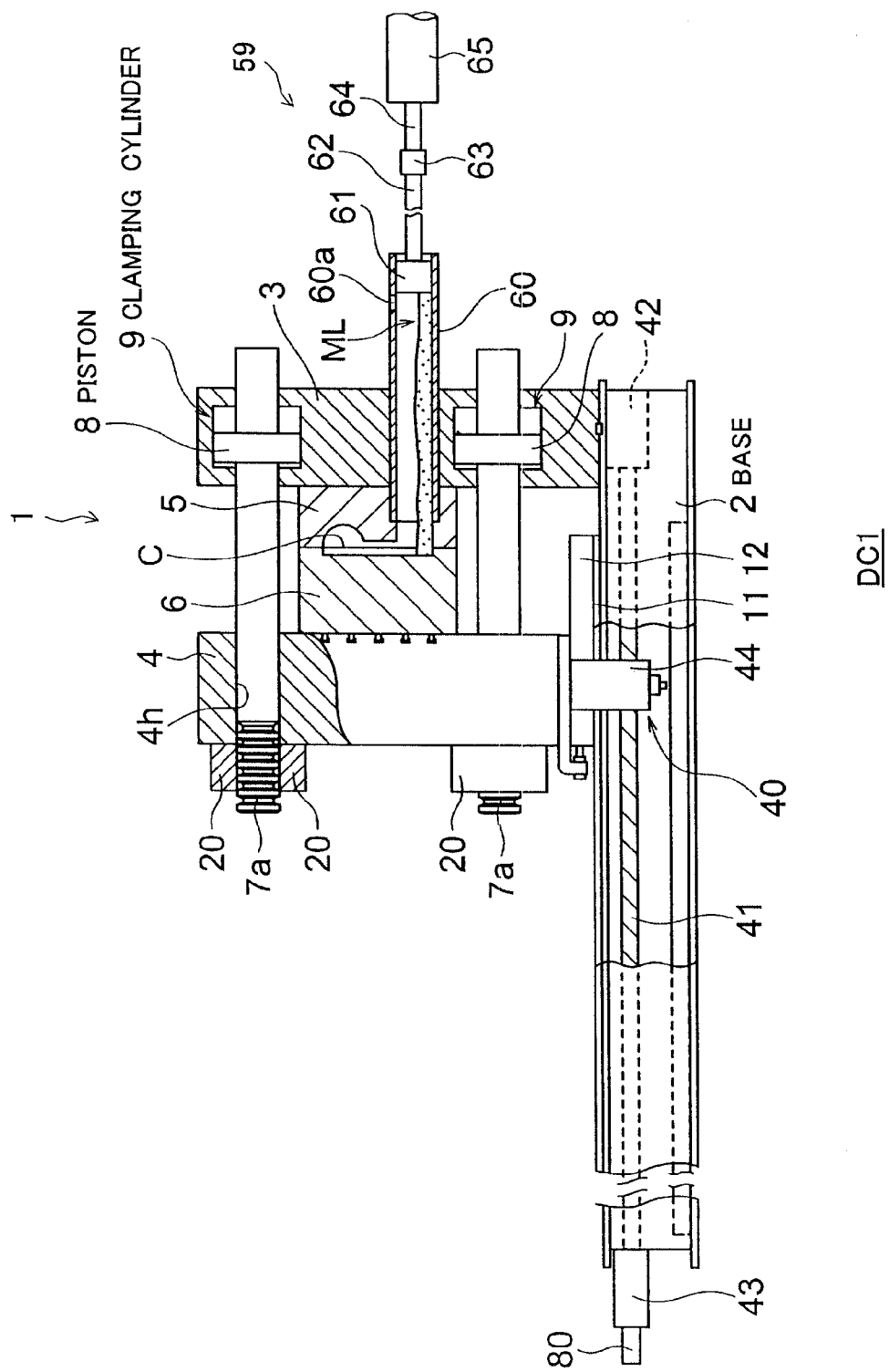
FIG. 3 is a view showing a state at the time of completion of clamping of the die cast machine of FIG. 1.

FIG. 1 is a front view including a partial sectional view showing the configuration of mechanical parts of a die cast machine (molding machine) DC1 according to an embodiment of the present invention and shows a state before adjustment of mold thickness. Further, FIG. 2 is a view of the die cast machine DC1 of FIG. 1 as seen from above. FIG. 3 is a front view including a partial sectional view showing the configuration of the mechanical parts of the die cast machine DC1 and shows a state where molten metal ML is injected after the completion of clamping.

The die cast machine DC1 is provided with a clamping system 1 for performing the clamping and an injection system 59 for feeding a melt into the clamping system 1. The clamping system 1 is constituted as a so-called complex type clamping system and provided with movement mechanisms 40 mainly utilized for opening/closing the mold and clamping cylinders 9 mainly utilized for the clamping. Further, the clamping system 1 is provided with a fixed mold plate 3, a moving mold plate 4, tie bars 7, and half nuts 20. Note that the half nuts 20 are an embodiment of the coupling parts of the present invention.

The fixed mold plate 3 is fixed onto a base 2. This fixed mold plate 3 holds the fixed mold 5 on the front surface side. The moving mold plate 4 holds the moving mold 6 on the front surface (side facing the fixed mold plate 3). The moving mold plate 4 is provided moveably in a mold opening direction A1 and a mold closing direction A2 on the base 2. Specifically, by using a sliding plate 11 fixed on the base 2 and a sliding plate 12 which is fixed beneath the moving mold plate 4 and can slide with respect to the sliding plate 11 to form a slider, a moving mold plate 4 is moveably supported with respect to the base 2. Further, the moving mold plate 4 is formed with through holes 4h into which the tie bars 7 are inserted. These through holes 4 are formed at for example the four corners of the moving mold plate 4. By closing the fixed mold 5 and the moving mold 6, a cavity C is formed between a concave portion 5a of the fixed mold 5 and a concave portion 6a of the moving mold 6.

A back surface of the fixed mold plate 3 is provided with a sleeve 60. A plunger tip 61 fit into the sleeve 60. The plunger tip 61 is provided at a front end of a plunger rod 62. The plunger rod 62 is connected via a coupling 63 with a piston rod 64 of an injection cylinder 65. The injection cylinder 65 is driven by hydraulic pressure and advances and retracts the piston rod 64. By moving the piston rod 64 forward in a state where the molten metal ML is fed into the sleeve 60 through the feed port 60a, the molten metal ML is injected and filled as the molding material into the cavity formed between the clamped fixed mold 5 and moving mold 6. Note that the injection system 59 is constituted by including the parts 60 to 65.

The tie bars 7 are horizontally supported by the fixed mold plate 3. Four tie bars 7 are provided and can be inserted into through holes 4h provided at the four corners of the moving mold plate 4. Note that, in the following description, notations A to D and 1 to 4 are sometimes added to the four tie bars 7 and the four components provided corresponding to the four tie bars 7. The free ends of the tie bars 7 on the moving mold plate 4 side are formed with coupled parts 7a. The coupled parts 7a are, for example, formed with a plurality of grooves extending in the circumferential directions in the outer circumferences of tie bars 7 while being aligned in the axial directions of tie bars 7. Note that the groove portions may be spirally formed. The other ends of tie bars 7 are provided with pistons 8 built-in the clamping cylinders 9.

The clamping cylinders 9 are formed inside the fixed mold plate 3. The fixed mold plate 3 holds the pistons 8 moveably in it. By feeding high pressure working fluid into the cylinder chambers of the clamping cylinders 9, a force acts between the fixed mold plate 3 and the tie bars 7, whereby the tie bars 7 are driven with respect to the fixed mold plate 3. The tie bars 7 can move with respect to the fixed mold plate 3 within the moveable range of the pistons 8 connected to the tie bars 7, that is, the range of the stroke of the clamping cylinders 9.

Each movement mechanism 40 is built in the base 2 and has a screw shaft 41, a support member 42, a servo motor 43, and a moveable member 44. The support member 42 is fixed with respect to the base 2 and rotatably supports one end of a screw shaft 41. The other end of the screw shaft 41 is connected to the servo motor 43 fixed with respect to the base 2. The screw shaft 41 is screwed into the moveable member 44. A moveable member 44 is fixed to each of the two sides of the moving mold plate 4 as shown in FIG. 2.

In the movement mechanisms 40, the rotations of the servo motors 43 are controlled to rotate the screw shafts 41. The rotations of the screw shafts 41 are converted to linear movement of the moveable members 44. Due to this, the moving mold plate 4 is driven in the mold opening direction A1 or the mold closing direction A2. The position of the moving mold plate 4 is identified by detecting the positions of the moveable members 44 by encoders 80 of the servo motors 43.

The half nuts 20 are arranged behind the through holes 4h of the moving mold plate 4. These half nuts 20 have not shown projection rim portions engaged with the coupled parts 7a of the tie bars 7. In other words, the coupled parts 7a and the half nuts 20 are formed in sawtooth state and mesh with each other. The half nuts 20 are opened/closed by half nut open/close cylinders 21. When the half nuts 20 are closed and meshed (coupled) with the coupled parts 7a of the tie bars 7, the tie bars 7 and the moving mold plate 4 are connected. When half nuts 20 open, the connection of the tie bars 7 and the moving mold plate 4 is released.

Figure 4:
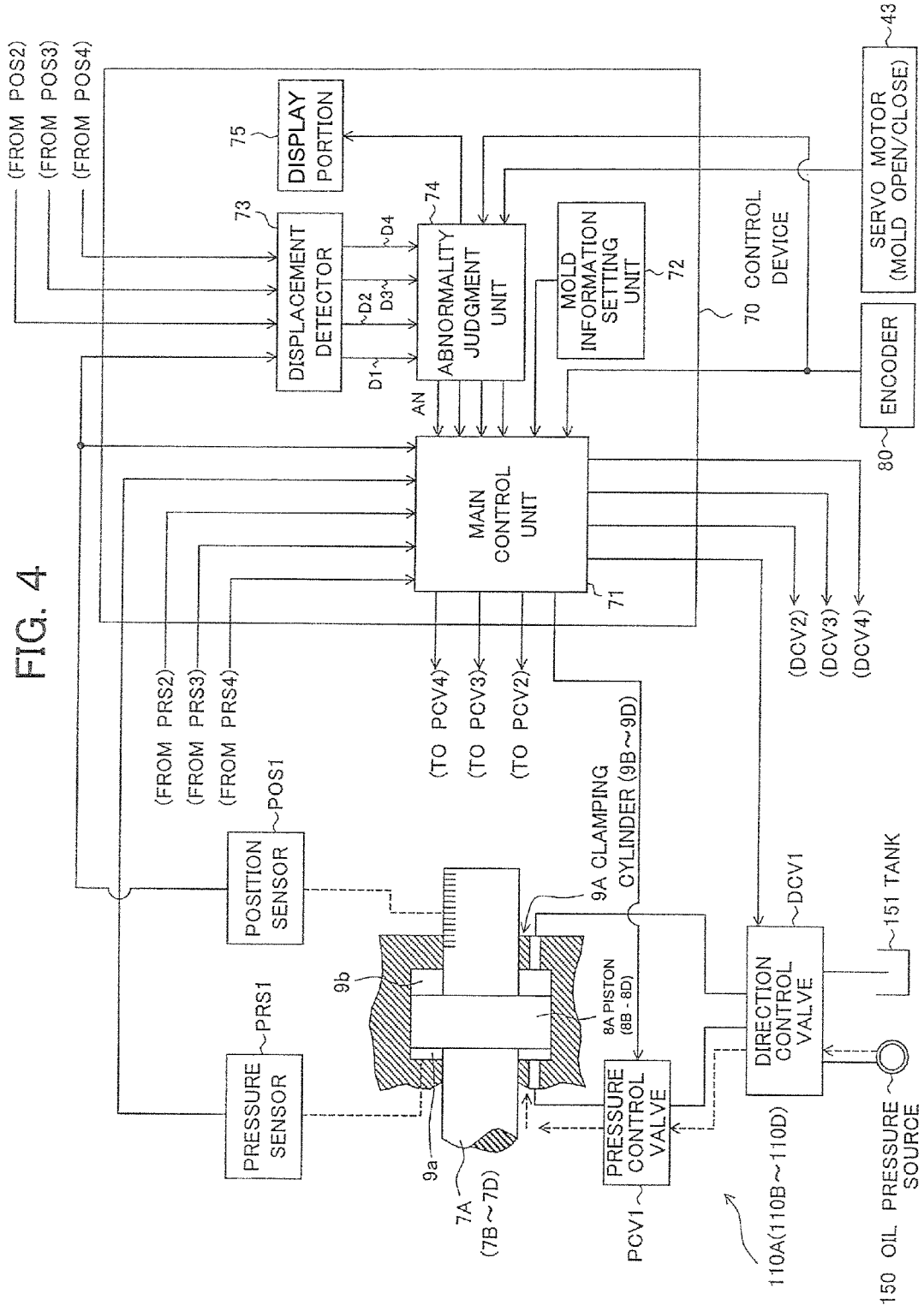
FIG. 4 is a block diagram showing the configuration of a signal processing system of the die cast machine of FIG. 1.

FIG. 4 is a block diagram showing the configuration of a signal processing system of the die cast machine DC1, more particularly shows the configuration of the signal processing system in the clamping system 1. The die cast machine DC1 is provided with a control device 70 for executing various processing based on signals from various detectors etc. The control device 70 also controls the drive etc. of the injection cylinder 65 and controls the overall die cast machine DC1 other than the shown signal processing. Further, it functions as the abnormality (foreign matter, burr) detector at the time of the mold closing, the time of boostup, and the time of injection. The clamping cylinder 9A is connected to a hydraulic circuit 110A. Note that the other three clamping cylinders 9B to 9D are connected to hydraulic circuits 110B to 110D having the same configuration as that of the hydraulic circuit 110A. This hydraulic circuit 110A is provided with a pressure control valve PCV1 and a direction control valve DCV1.

The direction control valve DCV1 feeds working fluid having a high pressure fed from an oil pressure source 150 into one of the cylinder chambers 9a and 9b of the clamping cylinder 9A in response to a control instruction from the control device 70. The main role of this direction control valve DCV1 is to feed working oil to one of the cylinder chambers 9a and 9b of the clamping cylinder 9A and adjust the position of the piston 8. For example, the direction control valve DCV1 determines the position of the piston 8 at a position where the half nut 20 can mesh with coupled grooves 7a of a tie bar 7. Note that the direction control valve DCV1 makes the working oil from the oil pressure source 150 flow toward a tank 151 when not driving the piston 8.

The pressure control valve PCV1, at the time of the clamping, adjusts the pressure of the working oil from the oil pressure source 150 fed through the direction control valve DCV1 to a pressure that is necessary for the clamping in response to the control instruction from the control device 70 and feeds it to the cylinder chamber 9a.

The cylinder chamber 9a of the clamping cylinder 9A is provided with a pressure sensor PRS1. Note that the cylinder chambers 9a of the other clamping cylinders 9B to 9D are provided with pressure sensors PRS2 to PRS4 the same as the pressure sensor PRS1. The pressure sensor PRS1 detects the pressure of the working oil in the cylinder chamber 9a and feeds back the detected pressure to the control device 70. Note that, the clamping force is defined by the pressure difference between the cylinder chamber 9a and the cylinder chamber 9b, therefore the pressure sensor PRS1 detects the clamping force too. Further, the pressure sensor may be provided so as to detect also the pressure of the cylinder chamber 9b.

On the cylinder chamber 9b side of the clamping cylinder 9A, a position sensor POS1 for detecting the position of a rear end of the tie bar 7A is provided. Note that position sensors POS2 to POS4 the same as the position sensor POS1 are provided also for the other tie bars 7B to 7D. The position sensors POS1 to POS4 are configured by for example linear sensors utilizing magnetism. By detecting the position of the rear end of the tie bar 7A by the position sensor POS1, the position of the piston 8 can be detected. Namely a portion between the piston 8 of the tie bar 7A and the coupled groove 7a is resiliently deformed at the time of the clamping, but the rear end of the tie bar 7A is not deformed at the time of the clamping, therefore the position of the piston 8 can be correctly identified by detecting the position of this rear end. The position information of the piston 8 detected by the position sensor POS1 is fed back to the control device 70.

The control device 70 has a main control unit 71, a mold information setting unit 72, a tie bar displacement detector 73, an abnormality judgment unit 74, and a display unit (alarm unit) 75. Functions of the control device 70 are configured by required hardware for example a processor and software.

The main control unit 71 outputs control instructions for independently controlling the pressure control valves PCV1 to PCV4 so that pressures of the working oil in the cylinder chambers 9a of the clamping cylinders 9A to 9D become the desired pressures. Further, the main control unit 71 outputs control instructions for independently controlling the direction control valves DCV1 to DCV4 and controls the positions of the pistons 8 of the tie bars 7A to 7D.

The mold information setting unit 72 sets information concerning the molds such as shape information of the fixed mold 5 and the moving mold 6 and information of attachment positions with respect to these fixed mold plate 3 and moving mold plate 4. The information is used for calculating the distribution of the force acting upon the fixed mold 5 and the moving mold 6 and display amounts generated in these. Note that the main control unit 71 utilizes the information concerning the molds set by the mold information setting unit 72 and determines the distribution of the tie bar load to be given to the tie bars 7A to 7D.

The displacement detector 73 detects displacements D1 to D4 of the pistons 8 of the tie bars 7A to 7D from the position information of the pistons 8 detected by the position sensors POS1 to POS4.

The abnormality judgment unit 74 judges the existence of any abnormality in the mold closing step based on the load information output from the servo motor 43 and the position information output from the encoder 80. Further, existence of any abnormality in the clamping step and the injection step is judged based on displacements D1 to D4 output from the tie bar displacement detector 73. The abnormality judgment unit 74 outputs a judgment signal AN indicating existence of any abnormality to the main control unit 71.

The display unit 75 is configured by for example a CRT or liquid crystal display or lamps which can blink and displays existence of any abnormality based on the signal output from the abnormality judgment unit 74.

Figure 5:
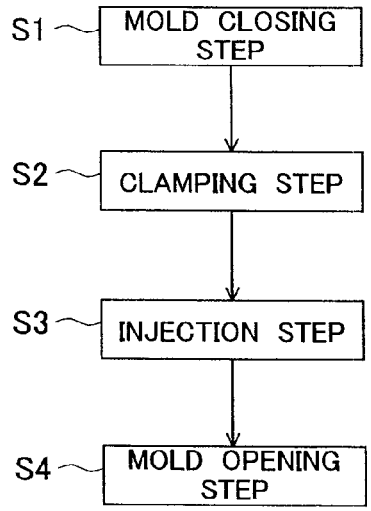
FIG. 5 is a flow chart summarizing the operation of the die cast machine of FIG. 1.

FIG. 5 is a flow chart showing an outline of a molding cycle in the die cast machine DC1. At step S1, the mold closing step of moving the moving mold plate 4 from the mold opening position shown in FIG. 1 and FIG. 2 to the mold closing position shown in FIG. 3 by the movement mechanisms 40 is carried out. At step S2, the clamping step of extending the tie bars 7 by the clamping cylinders 9 and generating the clamping force is carried out. At step S3, the injection step of injecting the melt into the cavity of the fixed mold 5 and the moving mold 6 by the injection cylinder 65 is carried out. At step S4, a mold opening step of moving the moving mold plate to the mold opening position by the movement mechanisms 40 is carried out.

Figure 6:
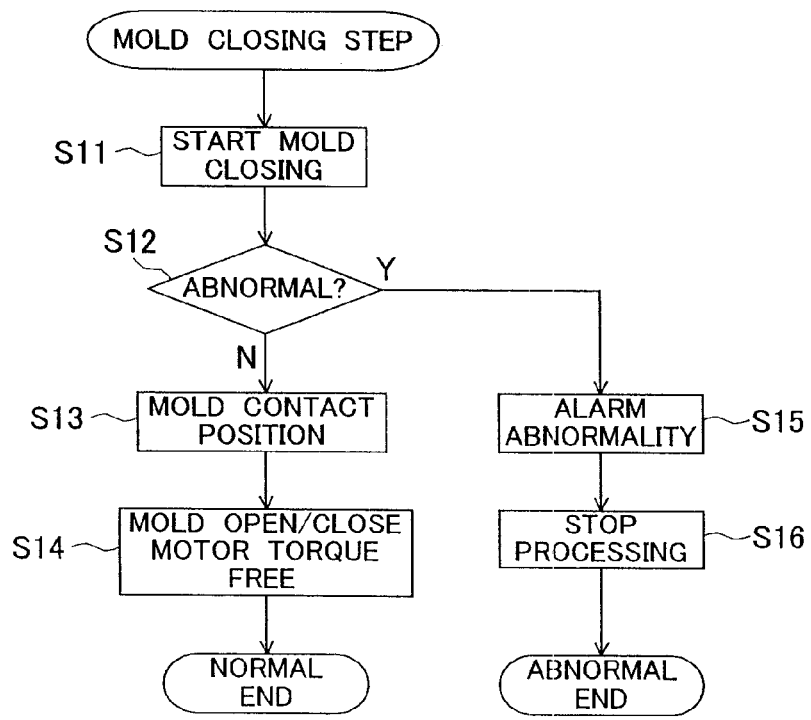
FIG. 6 is a flow chart showing details of a mold closing step of FIG. 5.

FIG. 6 is a flow chart showing the operation of the clamping system 1 in the mold closing step (step S1 of FIG. 5).

At step S11, the clamping system 1 starts the mold closing operation. Specifically, the control device 70 outputs control signals to the servo motors 43 of the movement mechanisms 40 and drives the servo motors 43 to rotate so as to move the moving mold plate 4 in the mold closing direction A1. At this time, based on the detection values from the encoders 80, the control device 70 performs feedback control so that the moving mold plate 4 moves with the set speed. For example, the control device 70 specifies the position of the moving mold plate 4 based on the detection values from the encoders 80 and controls the servo motors 43 so that the moving mold plate 4 moves with a relatively high speed when the moving mold plate 4 moves from the mold opening position to a predetermined intermediate position, while moves with a relatively low speed when it moves from the intermediate position to the mold contact position.

At step S12, existence of any abnormality is judged by the control device 70. The control device 70 performs for example one or more of the following judgments.

The control device 70 monitors the speed of the moving mold plate 4 based on the detection values of the encoders 80 and detects the stopping of the moving mold plate 4. Then, it judges whether or not the position at the time of stopping has reached the mold contact portion where the fixed mold 5 and the moving mold 6 contact. For example, when there is foreign matter between mold parts, the position at the time of stopping will not reach the mold contact position, so an abnormality will be detected.

The control device 70 also monitors the speed of the moving mold plate 4 based on the detection values of the encoders 80 and judges whether or not a change of speed exceeding a predetermined threshold value has occurred. For example, when a core drops or an attachment enters the mold by abnormal operating, an abrupt rise or drop of the speed of the moving mold plate 4 occurs before the moving mold plate 4 reaches the mold contact position, so an abnormality will be detected.

The control device 70 monitors the load information output from each servo motor 43 and judges if a load or the load fluctuation exceeding a predetermined threshold value has occurred. For example, when a core drops or an attachment enters the mold by abnormal operating, the load of the moving mold plate 4 is reduced or increases, therefore an abnormality will be detected. Note that the load of the servo motor 43 is calculated based on for example a current output to the servo motor 43, a rotation speed detected by the encoder 80 at that time, and a T-n characteristic of the servo motor 43 (characteristic of torque-rotation speed). Further, it may be judged whether or not a cumulative value of the load from the start of the mold closing to the stopping of the moving mold plate 4 exceeds a predetermined threshold value.

The control device 70 counts a time from the start of the mold closing to the stopping of the moving mold plate 4 and judges whether or not the count exceeds a predetermined threshold value. For example, when there is foreign matter between the mold parts, the time from the start of the mold closing of the moving mold plate 4 to the stopping of the moving mold plate 4 becomes long, therefore an abnormality will be detected.

Where it is judged at step S12 that no abnormality has occurred, the moving mold plate 4 reaches the mold contact position (step S13). Thereafter, the half nuts 20 and the coupled parts 7a of the tie bars 7 are coupled, the servo motors 43 are brought to the torque free state (step S14), and the mold closing step normally ends.

Note that at the coupling of the half nuts 20 and the coupled parts 7a, the control device 70 outputs control signals to the direction control valves DCV1 to DCV4 etc. and finely adjusts the positions of the tie bars 7 to positions where the half nuts 20 and the coupled parts 7a can mesh. Further, the half nuts 20 and the coupled parts 7a may be couple during movement of the moving mold plate 4 (before the mold contact) by moving the tie bars 7 in synchronization with the moving mold plate 4.

When it is judged at step S12 that an abnormality occurs, processing is performed for warning the user of the occurrence of the abnormality (step S15). For example, an image for informing the occurrence of the abnormality is displayed on the display unit 75. An alarm sound may also be output.

Thereafter, the stop processing is carried out in the clamping system 1 (step S16), and the mold closing step abnormally ends. The stop processing is processing of for example stopping movement at that position. For example, the control device 70 stops the servo motors 43 and sets them in the torque free state. Further, the control device 70 does not output control signals for the operation in the clamping step and injection step. Note that, after the abnormal end, a mold opening operation may be carried out and the mold closing step may be carried out again.

Figure 7:
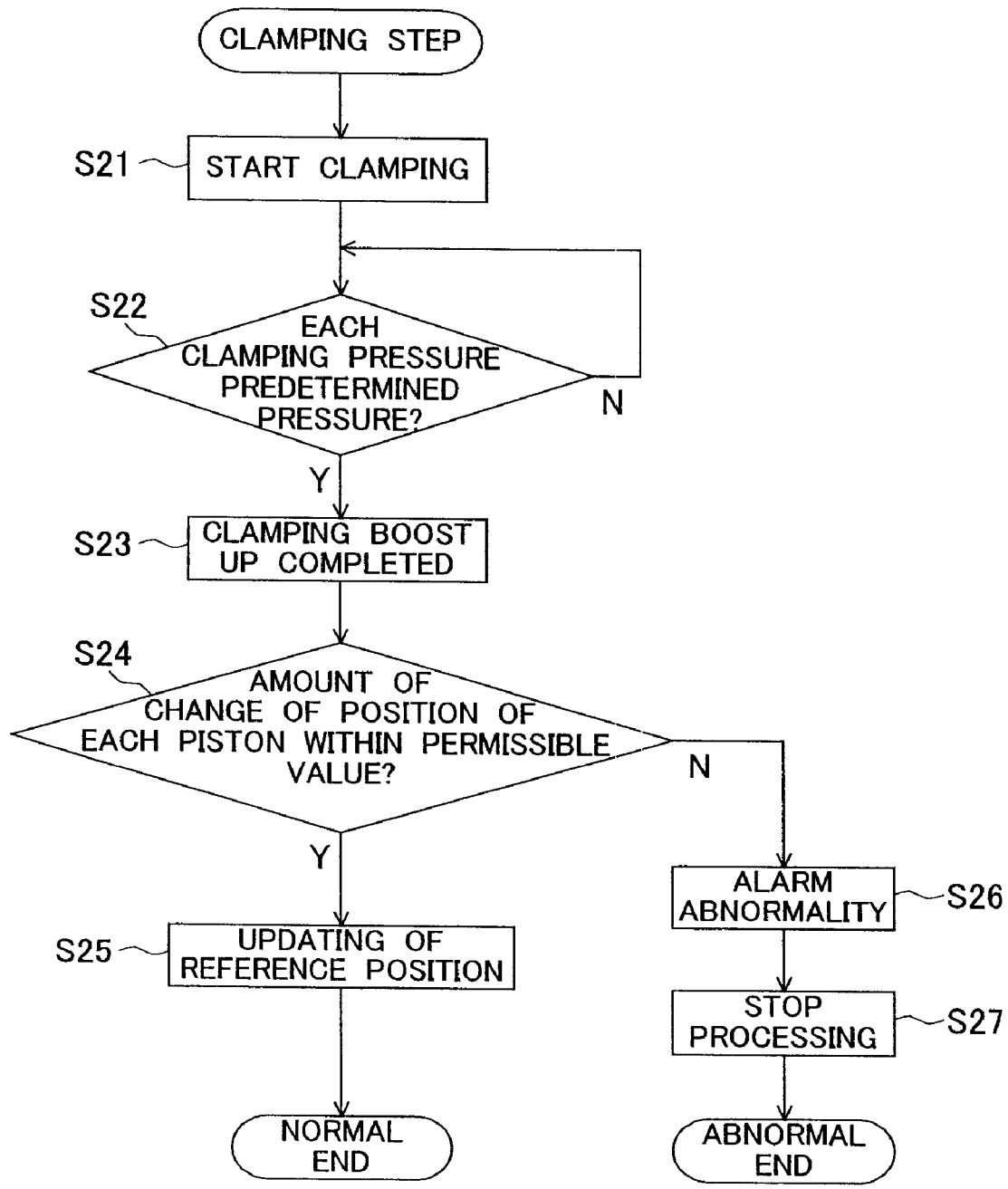
FIG. 7 is a flow chart showing details of a clamping step of FIG. 5.

FIG. 7 is a flow chart showing the operation of the clamping system 1 in the clamping step (step S2 in FIG. 5). Note that, the clamping step is carried out when the mold closing step of FIG. 6 normally ends, but is not carried out when it abnormally ends.

At step S21, the clamping system 1 starts the clamping operation. Specifically, the control device 70 outputs control signals to the control valves PCV1 to PCV4 etc. and drives the pistons 8A to 8D in the direction extending the tie bars 7A to 7D.

Note that, as mentioned above, tie bar loads to be given to the tie bars 7A to 7D are determined by utilizing the information concerning the molds set by the mold information setting unit 72. The target pressures (clamping completion pressures) in the clamping cylinders 9A to 9D are individually set based on the tie bar loads. Then, control operations of the clamping cylinders 9A to 9D are individually and independently carried out by the control device 70. Due to this, the distribution of pressure of the mold mating surfaces caused by asymmetry etc. of the cavity shape of the mold is made uniform and occurrence of burrs is efficiently suppressed.

At step S22, the control device 70 judges whether or not the pressures detected by the pressure sensors PRS1 to PRS4 reach the clamping completion pressure. A boostup operation is carried out until it is judged that pressures have been reached. When it is judged that the pressures reach the clamping completion pressures, the boostup of clamping is completed (step S23). Note that, the control device 70 controls the pressure control valves PCV1 to PCV4 etc. so that the detected pressures are maintained at the clamping completion pressures until the injection mentioned later is completed.

At step S24, it is judged whether or not the differences between the positions of pistons 8 detected by the position sensors POS1 to POS4 and the previously set reference positions are within the previously set permissible ranges. The reference positions are achieved where no foreign matter exists between mold parts. The permissible ranges are standards for judgment of existence of any foreign matter and are set so as to include minute error occurring even in a case where no foreign matter exists between mold parts, for example, measurement error. The reference positions and the permissible ranges are set based on measurement results of for example trial molding operations using the clamping system 1. Note that a reference position and a permissible range are set for each tie bar 7 and the judgment of whether or not the permissible ranges is maintained is carried out for each tie bar 7.

In the clamping step of FIG. 6, sometimes the fixed mold plate 3 and the moving mold plate 4 are not held parallel etc. and therefore there is a clearance between mold mating surfaces even when the mold parts contact. If foreign matter enters into the clearance, the foreign matter is not detected by the abnormality judgment at step S12. However, by the judgment at step S24, the foreign matter entering in the clearance is also detected.

Namely, when there is no foreign matter, the clearance between mold parts is reduced due to the movement of the pistons 8 in the mold closing direction A2 accompanying the advance of the clamping and the pistons 8 reach the reference positions, but when there is foreign matter in the clearance, due to the thickness of the foreign matter, the pistons 8 do not reach the reference positions. Further, it is judged whether or not the difference between the detected position of each piston 8 and the reference position is within the permissible range for each of the pistons 8A to 8D of the four tie bars 7A to 7D, therefore the foreign matter is detected no matter at what position the foreign matter is located.

At step S24, when it is judged that the differences between the detected positions and the reference positions are within the permissible ranges in all of the pistons 8A to 8D, the reference positions are updated based on the detected positions (step S25), and the clamping step is normally ended.

The reference positions are updated in order to maintain the precision of the foreign matter detection even when the molding cycle is advanced. Namely, the positions of the pistons 8 when there is no foreign matter change due to various factors such as heat expansion of the mold as the molding cycle is repeated. Accordingly, if the reference positions are made constant, there is a worry of judgment that foreign matter exists irrespective of absence of foreign matter or conversely there is a worry of judgment that foreign matter does not exist irrespective of the presence of foreign matter. Therefore, by updating the reference positions based on positions of pistons 8 detected at the time of the completion of clamping in the case where it is judged that there is no foreign matter, the change in the positions of the pistons 8 due to heat expansion etc. of the mold in the case where there is no foreign matter is coped with.

For example, when it is judged at step S24 that there is no foreign matter, the positions of the pistons 8 detected in that cycle are set as the reference positions in the next cycle. Alternatively, the reference positions are set based on positions of the pistons 8 detected in a plurality of cycles. For example, the positions of pistons 8 detected in a plurality of recent cycles in which it is judged there was no foreign matter are averaged and the average are set as the reference position. Note that the reference positions may be updated once every plurality of cycles.

When it is judged at step S24 that the differences between the detection positions of the pistons 8 and the reference positions exceed the permissible ranges, the processing for warning the user of the occurrence of an abnormality is executed (step S26). For example, an image for informing the user that an abnormality has occurred is displayed on the display unit 75. An alarm sound may also be output.

Thereafter, the clamping system 1 performs stop processing (step S27), whereby the clamping step abnormally ends. The stop processing is processing for stopping the operation at that position. The control device 70 stops the output of control signals to the pressure control valves PCV1 to PCV4. Further, the control device 70 does not output the control signals for the operation in the injection step. Note that, the mold opening may be carried out after the abnormal end, and the mold closing step and clamping step may be carried out again.

Figure 8:
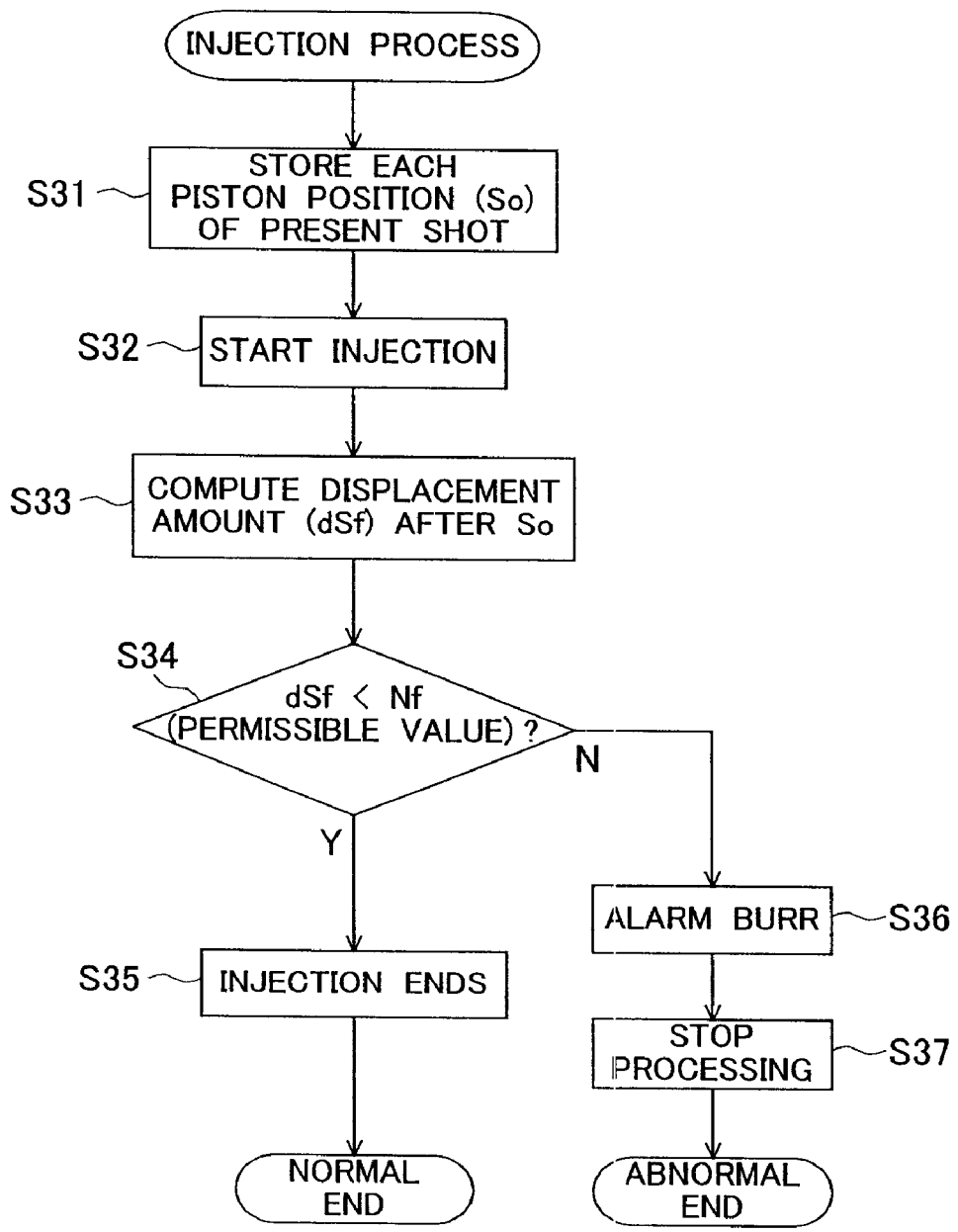
FIG. 8 is a flow chart showing details of an injection step of FIG. 5.

FIG. 8 is a flow chart showing the operation of the die cast machine DC1 (clamping system 1) in the injection step (step S3 of FIG. 5). Note that the injection step is carried out when the clamping step of FIG. 7 normally ends, but is not carried out when it abnormally ends.

At step S31, the control device 70 stores the present positions S0 of the pistons 8A to 8D detected by the position sensors POS1 to POS4.

At step S32, the melt is fed into the sleeve 60 and the plunger tip 61 moves forward by the injection cylinder 65, whereby the injection of the melt into the cavity formed by the fixed mold 5 and the moving mold 6 is started.

The plunger tip 61 is driven at a low speed up to for example a predetermined position, while is driven at a high speed from the predetermined position and injects and fills the melt into the cavity. Further, by transmission of the pressure of the injection cylinder 65 to the melt via the plunger tip 61, the melt is boosted in pressure. At this time, when the mold opening force by the pressure of the melt locally or wholly exceeds the clamping force, the pistons 8 move in the mold opening direction A1, clearance is generated between the fixed mold 5 and the moving mold 6, and burrs will occur. Accordingly, the occurrence of any burrs can be detected based on the positions of the pistons 8.

At step S33, based on the positions S0 of the pistons 8A to 8D before the start of injection stored at step S31 and the positions of the pistons 8A to 8D at present detected by the position sensors POS1 to POS4, displacement amounts dSf of the pistons 8A to 8D from the positions S0 are computed by the control device 70.

At step S34, the control device 70 judges whether or not the displacement amounts dSf are less than previously set permissible values Nf. The permissible values Nf are set including displacement amounts which can be generated even in the case where the burrs do not occur for example measurement error based on experiments or trial molding operations. Note that steps S33 and S34 may be repeatedly executed at appropriate time intervals from the start of the injection up to the end of the boostup.

When it is judged at step S34 that the displacement amounts dSf are less than the permissible values Nf, the injection (boostup) of the melt soon ends (step S35), and the operation normally ends.

On the other hand, when it is judged at step S34 that the displacement amounts dSf are not less than the permissible values Nf, processing for informing the occurrence of a burr to the user is executed (step S36). For example, an image informing the occurrence of an abnormality is displayed on the display unit 75. An alarm sound may also be output.

Thereafter, the clamping system 1 performs the stop processing (step S37), and the injection step abnormally ends. The stop processing is the processing for stopping for example repetition of the molding cycle. The control device 70 sets a flag indicating the occurrence of the burr. Thereafter, when the melt is solidified and the mold opening operation is carried out, the control device 70 judges whether or not a flag was established. When the flag is established, the control signal for the next molding cycle is not output.

According to the above embodiment, the occurrence of a burr is detected according to whether or not the displacement amounts of the pistons 8A to 8D of the plurality of tie bars 7A to 7D detected by the position sensors POS1 to POS4 from the start of the injection to the completion of the injection are within the permissible ranges (step S34 of FIG. 8), therefore the judgment of occurrence of a burr is carried out based on the displacement amounts corresponding to the thickness of the burr, the detection precision is improved, the setting of the permissible ranges becomes easy and convenient.

When the pistons move (the tie bars are extended) from the start of injection to the completion of injection and a burr occurs, the burr occurs due to the mold opening force generated by the pressure of the melt exceeding the clamping force due to a certain cause. As the cause of the mold opening force exceeding the clamping force, the presence of foreign matter at mold mating surfaces may be considered. Namely, when foreign matter exists at the mold mating surfaces, the melt flows into the clearance formed by the foreign matter, whereby the mold changes in the area and the shape receiving the pressure of the melt. Then, the mold opening force comprised of the sum of the pressures of the melt changes from the estimated one and locally exceeds the clamping force.

In the above embodiment, foreign matter between the fixed mold and the moving mold is detected before the time of completion of the clamping (step S12 of FIG. 6 and step S24 of FIG. 7). When foreign matter is detected, the melt is prevented from being injected into the cavity. In other words, the detection of the burr at step S34 of FIG. 8 is predicated on there being no foreign matter, therefore foreign matter can be eliminated from the cause of the occurrence of the burr. It is therefore easier to identify the cause of the occurrence of the burr.

The detection of foreign matter before the time of the completion of clamping is carried out by the judgment of whether or not the differences between positions of pistons 8A to 8D of the plurality of tie bars 7A to 7D detected by the position sensors POS1 to POS4 at the time of the completion of the clamping and reference positions are within the predetermined permissible ranges (step S24 of FIG. 7), therefore foreign matter can be detected on the entire mold mating surfaces.

Namely the tie bars are usually provided at positions sensitive to the parallel degree of the molds so that the parallel degree of the molds is held from the feed of the melt into the cavity to the solidification of the melt. In other words, they are provided so as to be sensitive to changes of positions in the mold open/close direction over the entire mold mating surfaces. For example, in the above embodiment, the tie bars 7A to 7D are provided at the four corners at the periphery of the mold. Then, foreign matter causing an abnormality in the position of the mold mating surfaces is detected based on positions of ends of the related tie bars 7A to 7D (pistons), therefore the foreign matter is detected over a wide range of the mold mating surfaces. For example, even in the case where the parallel degree of the fixed mold plate 3 and the moving mold plate 4 is not held, clearance is generated between mold parts at the time of the mold contact, and foreign matter exists in the clearance, the foreign matter can be detected.

The reference positions used for the judgment of the abnormality are updated based on the positions of the pistons 8A to 8D detected by the position sensors POS1 to POS4 when no abnormality is detected (step S25 of FIG. 7), therefore the change of the positions of the pistons 8A to 8D caused by heat expansion etc. of the mold is eliminated, and the detection precision of the foreign matter can be maintained.

When an abnormality between mold parts is detected from the start of the mold closing operation of the moving mold plate 4 to the time of the mold contact (step S12 of FIG. 6) and therefore an abnormality is detected, the clamping is not carried out (step S16 of FIG. 6), therefore the prerequisite of the detection of abnormality at the time of the completion of the clamping becomes that no abnormality is detected by the time of the mold contact. Accordingly, when an abnormality is detected at the time of the completion of the clamping, analysis of the cause of that abnormality becomes easy.

At this time, if monitoring the movement speed or load of the moving mold plate 4 and detecting an abnormality between molds according to whether or not fluctuation of the movement speed or load is within a predetermined permissible range, the abnormality can be detected and coped with even in the middle of the mold closing operation before the mold contact. For example, a core dropping or an attachment entering by abnormal operating right after the start of the mold closing operation can be detected. Accordingly, the possibility of damage to the mold is reduced in comparison with for example the case where an abnormality cannot be detected by the mold contact.

The present invention is not limited to the above embodiments and can be executed in various aspects.

The molding machine to which the present invention is applied is not limited to a die cast machine. The molding machine includes a metal molding machine, a plastic injection molding machine, a sawdust molding machine, etc. A sawdust molding machine etc. includes for example one molding a material obtained by blending a thermoplastic resin in sawdust.

In the above embodiments, the explanation was given of the case where the fixed mold plate 3 was provided with the clamping cylinders 9 and the moving mold plate 4 was provided with the half nuts 20, but it is also possible to employ a configuration providing the clamping cylinders 9 in the moving mold plate 4 and providing the half nuts 20 in the fixed mold plate 3.

The number of tie bars is not limited to four so long as it is a plurality. Note that in order to keep the parallel degrees in the up/down direction and left/right direction of the mold, preferably three or more tie bars are provided. By providing three or more, the detection precision of abnormalities is improved.

The coupling parts and the coupled parts need only be ones which can couple with each other can limit the movement of tie bars with respect to the fixed mold plate or the moving mold plate in the axial direction. They are not limited to half nuts and grooves provided in tie bars. For example, holes perpendicular to the axial direction of the tie bars may be provided in the tie bars and bolts may be inserted into the holes so as to fix the tie bars with respect to the mold plate.

The working fluid is not limited to oil and may be for example water.

It should be understood by those skilled in the art that various modifications, combinations, sub-combinations and alterations may occur depending on design requirements and other factors insofar as they are within the scope of the appended claims or the equivalents thereof.

The invention claimed is:

1. A molding machine injecting a melt into a cavity defined by a clamped fixed mold and a moving mold, comprising:
    a fixed mold plate holding said fixed mold,
    a moving mold plate holding said moving mold and moveable in a mold open and close direction with respect to said fixed mold plate,
    a plurality of tie bars each having a coupled part coupling with one of said fixed mold plate and said moving mold plate and a tie bar drive piston accommodated at the other of said fixed mold plate and said moving mold plate and generating clamping force,
    a plurality of coupling parts provided at said one of said fixed mold plate and said moving mold plate and able to be coupled with or released from the coupled parts of said plurality of tie bars,
    a plurality of clamping cylinders provided at said other of said fixed mold plate and said moving mold plate and having cylinder chambers accommodating said plurality of tie bar drive pistons and at least two working fluid feed ports feeding working fluid generating the clamping force into said cylinder chambers,
    an injection system injecting the melt into said cavity after the completion of clamping by said clamping cylinders,
    position sensors detecting positions of said plurality of tie bar drive pistons in the mold open and close direction with respect to said other of said fixed mold plate and said moving mold plate, and
    a burr detector detecting the occurrence of a burr according to whether or not displacement amounts of said plurality of tie bar drive pistons detected by said position sensors for a period from the start of the injection by said injection system to the completion of the injection are within predetermined permissible ranges.

2. A molding machine as set forth in claim 1, further comprising:
    a foreign matter detector detecting foreign matter between said fixed mold and said moving mold before the completion of the clamping and
    a control device controlling said injection system so that melt is not injected into said cavity when said foreign matter detector detects foreign matter.

3. A molding machine as set forth in claim 2, further comprising:
    pressure sensors detecting the pressures of said cylinder chambers, and
    a control device controlling the operation of valves so that the pressures detected by said pressure sensors reach predetermined clamping completion pressures, wherein
    said foreign matter detector detects foreign matter between mold parts according to judgment of whether or not differences between positions of said plurality of tie bar drive pistons detected by said position sensors when the pressures detected by said pressure sensors reach the predetermined clamping completion pressures and predetermined reference positions are within predetermined permissible ranges.

4. A clamping system clamping a fixed mold and a moving mold, said clamping system comprising:
a fixed mold plate holding said fixed mold,
a moving mold plate holding said moving mold and moveable in a mold open and close direction with respect to said fixed mold plate,
a plurality of tie bars each having a coupled part coupling with one of said fixed mold plate and said moving mold plate and a tie bar drive piston accommodated at the other of said fixed mold plate and said moving mold plate and generating clamping force,
a plurality of coupling parts provided at said one of said fixed mold plate and said moving mold plate and able to be coupled with or released from the coupled parts of said plurality of tie bars,
a plurality of clamping cylinders provided at said other of said fixed mold plate and said moving mold plate and having cylinder chambers accommodating said plurality of tie bar drive pistons and at least two working fluid feed ports feeding working fluid generating the clamping force into said cylinder chambers,
a plurality of valves connected to said working fluid feed ports controlling the feed of said working fluid into first cylinder chambers and second cylinder chambers partitioned by said tie bar drive pistons in said plurality of clamping cylinders,
pressure sensors detecting the pressures of at least one of said first cylinder chambers and said second cylinder chambers,
a control device controlling operations of said valves so that the pressures detected by said pressure sensors reach the predetermined clamping completion pressures,
position sensors detecting positions of said plurality of tie bar drive pistons in the mold open and close direction with respect to said other of said fixed mold plate and said moving mold plate, and
a clamping abnormality detector detecting an abnormality between mold parts by judgment of whether or not the differences between positions of said plurality of tie bar drive pistons detected by said position sensors when the pressures detected by said pressure sensors reach the predetermined clamping completion pressures and the predetermined reference positions are within predetermined permissible ranges.

5. A clamping system as set forth in claim 4, wherein said clamping abnormality detector updates said reference positions by using positions of said tie bar drive pistons detected by said position sensors when an abnormality is not detected.

6. A clamping system as set forth in claim 4, further comprising:
a drive portion imparting a drive force in a mold open and close direction to said moving mold plate, and
a mold closing abnormality detector detecting an abnormality between mold parts from the start of the mold closing to the mold contact, wherein
said control device controls said drive portion so as to stop the drive force to said moving mold plate when said mold closing abnormality detector detects an abnormality.

7. A clamping system as set forth in claim 4, wherein said mold closing abnormality detector monitors a movement speed of said moving mold plate or a load of said drive portion and detects an abnormality between molds according to whether or not a fluctuation of said movement speed or said load is within a predetermined permissible range.

8. A burr detection method of a molding machine injecting a melt into a cavity defined by a clamped fixed mold and moving mold,
said molding machine having:
a fixed mold plate holding said fixed mold,
a moving mold plate holding said moving mold and moveable in a mold open and close direction with respect to said fixed mold plate,
a plurality of tie bars each having a coupled part coupling with one of said fixed mold plate and said moving mold plate and a tie bar drive piston accommodated at the other of said fixed mold plate and said moving mold plate and generating clamping force,
a plurality of coupling parts provided at said one of said fixed mold plate and said moving mold plate and able to be coupled with or released from the coupled parts of said plurality of tie bars, and
a plurality of clamping cylinders provided at said other of said fixed mold plate and said moving mold plate and having cylinder chambers accommodating said plurality of tie bar drive pistons and at least two working fluid feed ports feeding working fluid generating the clamping force into said cylinder chambers, comprising
detecting positions of said plurality of tie bar drive pistons in the mold open and close direction with respect to said other of said fixed mold plate and said moving mold plate; and
detecting the occurrence of the burrs according to whether or not displacement amounts of said plurality of tie bar drive pistons detected from the start of the injection to the completion of the injection are within predetermined permissible ranges.

9. An abnormality detection method detecting an abnormality between mold parts in a clamping system clamping a fixed mold and a moving mold,
said clamping system having:
a fixed mold plate holding said fixed mold,
a moving mold plate holding said moving mold and moveable in a mold open and close direction with respect to said fixed mold plate,
a plurality of tie bars each having a coupled part coupling with one of said fixed mold plate and said moving mold plate and a tie bar drive piston accommodated at the other of said fixed mold plate and said moving mold plate and generating clamping force,
a plurality of coupling parts provided at said one of said fixed mold plate and said moving mold plate and able to be coupled with or released from the coupled parts of said plurality of tie bars, and
a plurality of clamping cylinders provided at said other of said fixed mold plate and said moving mold plate and having cylinder chambers accommodating said plurality of tie bar drive pistons and at least two working fluid feed ports feeding working fluid generating the clamping force into said cylinder chambers, comprising
detecting pressures of said cylinder chambers,
controlling the feeding of the working fluid into said cylinder chambers so that the detected pressures reach the predetermined clamping completion pressures,
detecting positions of said plurality of tie bar drive pistons in the mold open and close direction with respect to said other of said fixed mold plate and said moving mold plate when the pressures detected reach the predetermined clamping completion pressures, and detecting an abnormality between mold parts by judgment of whether or not the differences between detected positions and the predetermined reference positions are within predetermined permissible ranges.

* * * * *